Dec. 11, 1945.  E. L. FRITZBERG  2,390,579
STIRRING DEVICE
Filed Oct. 31, 1942
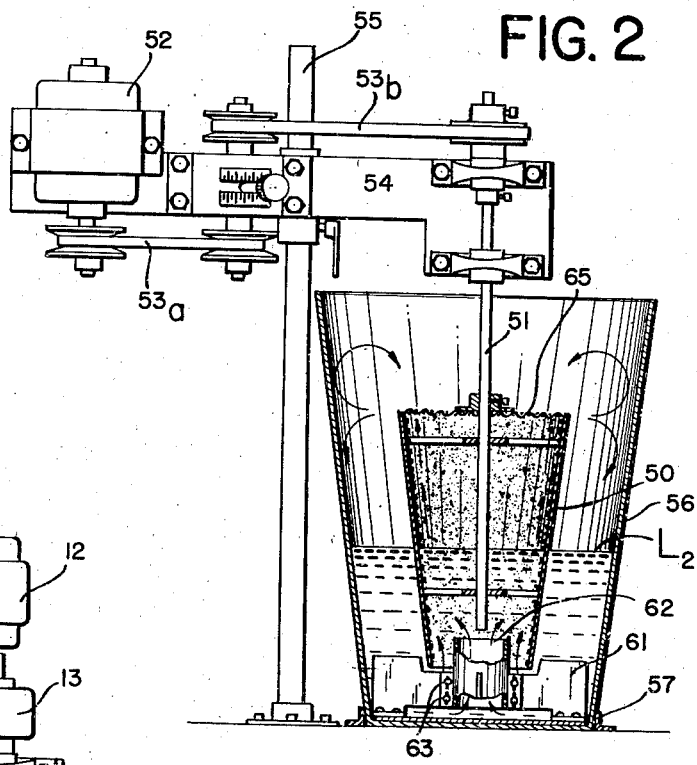
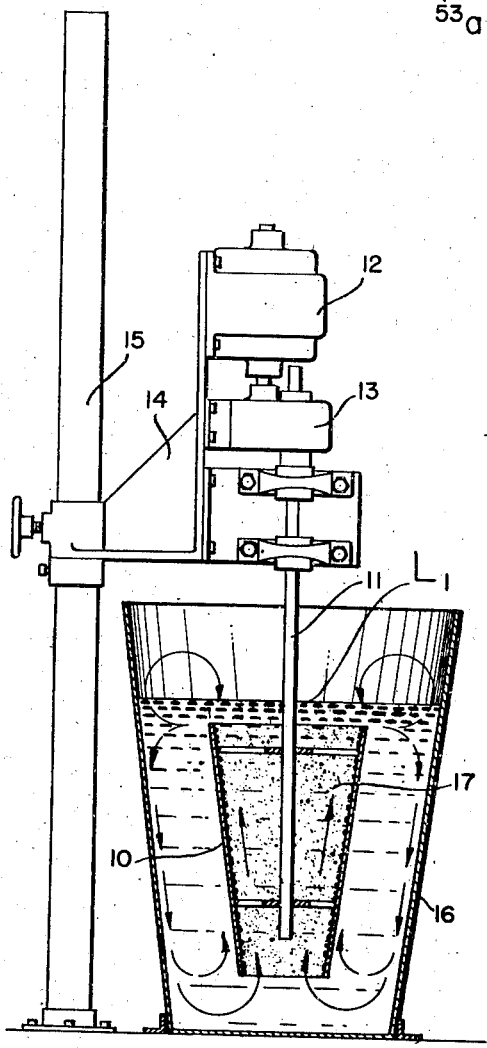
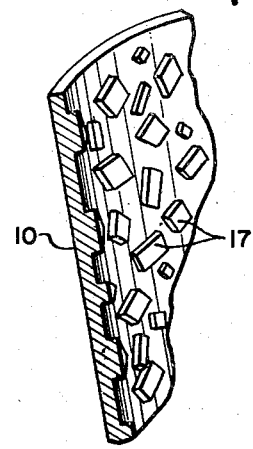
INVENTOR:-
EDWARD L. FRITZBERG
BY Arthur R. Wylie
ATTY.

Patented Dec. 11, 1945

2,390,579

UNITED STATES PATENT OFFICE 2,390,579

STIRRING DEVICE

Edward L. Fritzberg, Minneapolis, Minn., assignor to General Mills, Inc., a corporation of Delaware Application October 31, 1942, Serial No. 464,068

1 Claim. (Cl. 259—95)

This invention relates to stirring devices.

An object of the invention is to provide a simple and efficient stirring device and one which both stirs and mixes liquids and solids, particularly viscous liquids. In blending certain dry ingredients into liquids, such as rye flour into water, lumps occur which are often difficult to break up and blend properly into the mass.

Another object of this invention is to provide a means for blending such ingredients which will cause said lumps to break up to make a smooth blend.

These and other objects as will hereinafter appear are accomplished by this invention which is fully described in the following specification and shown in the accompanying drawing in which Figure 1 is a side elevation of one embodiment of the invention showing the parts partly in section;

Fig. 2 is a similar view showing a modified form of the invention; and

Fig. 3 is an enlarged partial perspective partly in section of the conical mixing member.

The embodiment illustrated in Fig. 1 comprises a conical stirring and mixing member 10 mounted on a shaft 11 which is driven by means of a motor 12 through any suitable reduction gearing 13, the whole being carried on a bracket 14 which is adjustably mounted on a post 15.

The stirring and mixing member 10 preferably takes the form of a hollow inverted cone, the inner face of which is preferably smooth except for the addition of a great number of small pieces 17 preferably of metal cut from a plate with a shear so as to produce sharp edges. These pieces are secured to the relatively smooth inner face of the cone 10 as by soldering or brazing and are carefully distributed so as to maintain the static balance of the conical member 10 as a whole.

When the cone 10 is rotated at high speed while completely submerged, as shown in Fig. 1, liquid will enter the bottom of the cone and due to centrifugal action will pass up along the inner surface of the cone and be thrown off the upper edge of the cone in a generally radial direction. The general path of the flow is indicated by the arrows, part of the material thus being thrown off tending to pass radially outward and to roll back toward the upper edge of the cone while some of it will pass downwardly between the cone and the inner wall of the container 16. While most of it will pass through the hollow center of the cone, some of it will pass up along the outer surface of the cone also.

The form shown in Fig. 1 is intended primarily for viscous liquids which because of their viscosity will resist a tendency to rotate with the cone in the container where no means is provided for preventing such rotation.

In Fig. 2 is shown a modified form of the device in which a similar cone 50 is mounted on a shaft 51 and driven by a motor 52 through suitable belt drives 53a, 53b which provide the necessary means for varying the speed of the drive. This is likewise carried on a bracket 54 which is adjustably mounted on a standard 55. A container 56 is again used which, as before, holds the liquid into which the conical member dips. This container is preferably positioned with respect to the shaft 51 by means of a ledge 57.

In this form a baffle 61 is provided beneath the conical member for stopping rotation of the liquid which is required when a liquid of low viscosity is acted upon. A tubular member 62 is also preferably carried by the baffle 61 and may be adjustably mounted thereon by means of screws 63 or the like. This tubular member is located axially of the shaft 51 so as to direct the liquid upwardly inside the cone.

It will be noted that in this case the level of the liquid $L_2$ is considerably beneath the top of the cone 50, whereas in Fig. 1 the level of the liquid $L_1$ is above the top of the cone.

It will also be noted that the cone of Fig. 2 is provided at its top with a metal screen 65 which serves to stop any lumps which might otherwise pass through the pieces 17 and it also serves to break up these pieces before leaving the cone.

Thus it will be seen that I have provided a very simple and efficient means for blending liquids or liquids and solids and one which lends itself readily to cleaning after use.

One use of this device would be for making batters of various kinds.

While I have shown and described but a few embodiments of my invention, it is to be understood that it is capable of many modifications. Changes, therefore, may be made which do not depart from the spirit and scope of my invention as disclosed in the appended claim.

I claim as my invention:

A stirring device comprising a shaft, a hollow inverted truncated conical member mounted axially on the shaft and having a series of polygonal pieces secured to the inside of the member said pieces having sharp edges extending inwardly so as to violently abrade any lumps passing therethrough, said conical member being adapted to dip into a liquid to be stirred, means for rotating the shaft, a container, and means for moving the shaft axially with respect to the container to adjust the depth of the conical member in the liquid.

EDWARD L. FRITZBERG.